(12) United States Patent
Tauber et al.

(10) Patent No.: US 8,372,191 B2
(45) Date of Patent: Feb. 12, 2013

(54) INK JET INK

(75) Inventors: Gerd Tauber, Seligenstadt (DE);
Werner Kalbitz, Rodenbach (DE);
Ralph McIntosh, Hanau (DE);
Christoph Batz-Sohn,
Hanau-Mittelbuchen (DE); Alfons Karl,
Gründau (DE)

(73) Assignee: Evonik Carbon Black GmbH, Hanau (DE)

( * ) Notice: Subject to any disclaimer, the term of this patent is extended or adjusted under 35 U.S.C. 154(b) by 49 days.

(21) Appl. No.: 12/633,580

(22) Filed: Dec. 8, 2009

(65) Prior Publication Data

US 2010/0147187 A1    Jun. 17, 2010

(30) Foreign Application Priority Data

Dec. 12, 2008  (DE) .......................... 10 2008 061 737

(51) Int. Cl.
*C09D 11/02* (2006.01)
(52) U.S. Cl. ..................................... 106/31.6; 106/31.9
(58) Field of Classification Search .................. 106/31.6, 106/31.9
See application file for complete search history.

(56) References Cited

U.S. PATENT DOCUMENTS

| | | | |
|---|---|---|---|
| 3,133,893 A | 5/1964 | Newmann | |
| 3,314,814 A | 4/1967 | Newman | |
| 3,519,452 A | 7/1970 | Rivin | |
| 3,660,133 A * | 5/1972 | Van Der Schuyt et al. | ... 106/473 |
| 3,705,043 A | 12/1972 | Zabiak | |
| 3,749,670 A | 7/1973 | Ormsbee et al. | |
| 3,841,888 A | 10/1974 | Belde et al. | |
| 3,903,034 A | 9/1975 | Zabiak et al. | |
| 3,946,138 A | 3/1976 | Jones | |
| 3,998,652 A | 12/1976 | Volker et al. | |
| 4,055,439 A | 10/1977 | Babler | |
| 4,075,160 A | 2/1978 | Mills | |
| 4,076,527 A | 2/1978 | Nealy | |
| 4,366,139 A | 12/1982 | Kuhner et al. | |
| 4,368,582 A | 1/1983 | Graser | |
| 4,435,377 A | 3/1984 | Rothbuhr | |
| 4,435,378 A | 3/1984 | Reck | |
| 4,486,033 A | 12/1984 | Parrotta | |
| 4,536,776 A | 8/1985 | Knirsch et al. | |
| 4,698,913 A | 10/1987 | Voll | |

(Continued)

FOREIGN PATENT DOCUMENTS

| | | |
|---|---|---|
| CA | 2 740 672 A1 | 4/2010 |
| CN | 1858531 A | 11/2006 |

(Continued)

OTHER PUBLICATIONS

U.S. Appl. No. 13/031,694, filed Feb. 22, 2011, Schinkel.

(Continued)

*Primary Examiner* — Melvin C Mayes
*Assistant Examiner* — Veronica F Faison
(74) *Attorney, Agent, or Firm* — Law Office of: Michael A. Sanzo, LLC

(57) ABSTRACT

Ink jet ink containing at least one pigment and at least one oxidized carbon black.
The ink jet ink is prepared in a process wherein the pigment is dispersed in at least one solvent, followed by addition of the oxidized carbon black and renewed dispersing.
The ink jet ink can be used for printing textiles, metal, foil, film, sheet, glass and paper.

20 Claims, 1 Drawing Sheet

U.S. PATENT DOCUMENTS

| | | |
|---|---|---|
| 4,836,852 A | 6/1989 | Knirsch |
| 4,879,335 A | 11/1989 | Hirota et al. |
| 4,909,853 A | 3/1990 | Wienkenhover |
| 4,963,616 A | 10/1990 | Jenekhe |
| 5,021,291 A | 6/1991 | Kobayashi et al. |
| 5,085,698 A | 2/1992 | Ma et al. |
| 5,164,232 A | 11/1992 | Henseleit |
| 5,320,668 A | 6/1994 | Shields et al. |
| 5,430,088 A | 7/1995 | Ohashi et al. |
| 5,531,818 A | 7/1996 | Lin et al. |
| 5,554,739 A | 9/1996 | Belmont |
| 5,609,671 A | 3/1997 | Nagasawa |
| 5,620,743 A | 4/1997 | Harth |
| 5,639,817 A | 6/1997 | Probst |
| 5,713,988 A | 2/1998 | Belmont et al. |
| 5,760,112 A | 6/1998 | Hirota et al. |
| 5,772,975 A | 6/1998 | Mise et al. |
| 5,837,044 A | 11/1998 | Santilli |
| 5,851,280 A | 12/1998 | Belmont et al. |
| 5,859,120 A | 1/1999 | Karl |
| 5,922,118 A | 7/1999 | Johnson et al. |
| 5,929,134 A | 7/1999 | Lent et al. |
| 5,977,209 A | 11/1999 | Breton et al. |
| 6,056,933 A | 5/2000 | Vogler et al. |
| 6,063,182 A | 5/2000 | Babler |
| 6,099,818 A | 8/2000 | Freund |
| 6,132,505 A | 10/2000 | Linde |
| 6,136,286 A | 10/2000 | Okuyama |
| 6,171,382 B1 | 1/2001 | Stubbe et al. |
| 6,212,794 B1 | 4/2001 | Zhu |
| 6,221,142 B1 | 4/2001 | Wang et al. |
| 6,224,735 B1 | 5/2001 | Akutsu et al. |
| 6,242,382 B1 | 6/2001 | Bratz |
| 6,251,983 B1 | 6/2001 | Vogler et al. |
| 6,403,695 B1 | 6/2001 | Soeda et al. |
| 6,290,767 B1 | 9/2001 | Bergemann et al. |
| 6,312,513 B1 | 11/2001 | Hoefer |
| 6,337,302 B1 | 1/2002 | Teng |
| 6,358,487 B1 | 3/2002 | Omae et al. |
| 6,387,168 B1 * | 5/2002 | Koitabashi et al. .......... 106/31.6 |
| 6,451,100 B1 | 9/2002 | Karl |
| 6,471,763 B1 | 10/2002 | Karl |
| 6,491,976 B2 | 12/2002 | Horiuchi |
| 6,503,311 B1 | 1/2003 | Karl et al. |
| 6,569,231 B1 | 5/2003 | Mathias |
| 6,582,505 B1 | 6/2003 | Bouvy |
| 6,646,023 B1 | 11/2003 | Nyssen |
| 6,660,075 B2 | 12/2003 | Bergemann |
| 6,685,769 B2 | 2/2004 | Karl |
| 6,715,420 B2 | 4/2004 | Blake et al. |
| 6,758,891 B2 | 7/2004 | Bergemann et al. |
| 6,780,389 B2 | 8/2004 | Karl et al. |
| 6,783,836 B2 | 8/2004 | Bennett et al. |
| 6,821,334 B2 | 11/2004 | Nakamura |
| 6,956,006 B1 | 10/2005 | Mirsky et al. |
| 6,960,250 B2 | 11/2005 | Luethge et al. |
| 7,005,004 B2 | 2/2006 | Kalbitz |
| 7,160,377 B2 | 1/2007 | Zoch |
| 7,217,405 B2 | 5/2007 | Karl |
| 7,300,964 B2 | 11/2007 | Niedermeier et al. |
| 7,435,857 B2 | 10/2008 | Poellmann |
| 8,236,274 B2 | 8/2012 | Quitmann et al. |
| 8,328,930 B2 | 12/2012 | Tauber et al. |
| 2001/0036994 A1 | 11/2001 | Bergemann |
| 2002/0041317 A1 | 4/2002 | Kashiwazaki et al. |
| 2003/0000409 A1 | 1/2003 | Blake et al. |
| 2003/0101901 A1 | 6/2003 | Bergemann et al. |
| 2003/0109010 A1 | 6/2003 | Bergemann et al. |
| 2003/0134938 A1 | 7/2003 | Nakamura |
| 2003/0180210 A1 | 9/2003 | Karl |
| 2004/0087707 A1 | 5/2004 | Zoch |
| 2004/0123733 A1 | 7/2004 | Butler |
| 2004/0123773 A1 | 7/2004 | Butler et al. |
| 2004/0248731 A1 | 12/2004 | Vogel et al. |
| 2005/0014864 A1 | 1/2005 | Akers |
| 2005/0062205 A1 | 3/2005 | Zak |
| 2005/0090609 A1 | 4/2005 | Reisacher |
| 2006/0086834 A1 | 4/2006 | Pfeffer |
| 2006/0230550 A1 | 10/2006 | Hees |
| 2006/0243165 A1 | 11/2006 | Lüthge |
| 2007/0031319 A1 | 2/2007 | Lüthge |
| 2007/0044682 A1 | 3/2007 | Nick et al. |
| 2007/0076068 A1 | 4/2007 | Guo et al. |
| 2007/0076071 A1 | 4/2007 | Iu et al. |
| 2008/0214730 A1 | 9/2008 | Henry |
| 2008/0219915 A1 | 9/2008 | Quitmann |
| 2009/0035210 A1 | 2/2009 | Krauss |
| 2009/0155157 A1 | 6/2009 | Stenger |
| 2009/0305011 A1 | 12/2009 | McIntosh |
| 2010/0180794 A1 | 7/2010 | Tauber |
| 2010/0248120 A1 | 9/2010 | Riebel |
| 2011/0034611 A1 | 2/2011 | Pelster et al. |
| 2011/0207872 A1 | 8/2011 | Schinkel |
| 2011/0232531 A1 | 9/2011 | Götz et al. |

FOREIGN PATENT DOCUMENTS

| | | |
|---|---|---|
| DE | 25 40 355 A1 | 3/1976 |
| DE | 30 41 188 A1 | 6/1982 |
| DE | 36 15 571 A1 | 11/1987 |
| DE | 43 08 488 A1 | 9/1994 |
| DE | 195 21 565 A1 | 1/1997 |
| DE | 196 13 796 A1 | 10/1997 |
| DE | 197 31 572 A1 | 1/1999 |
| DE | 197 48 575 A1 | 5/1999 |
| DE | 198 39 925 A1 | 10/1999 |
| DE | 198 24 947 | 12/1999 |
| DE | 199 34 282 A1 | 1/2001 |
| DE | 102 42 875 A1 | 5/2003 |
| DE | 10 2004 058 271 A1 | 6/2006 |
| DE | 10 2007 026 214 A1 | 12/2008 |
| DE | 10 2007 026 551 A1 | 12/2008 |
| EP | 0 036 520 A2 | 9/1981 |
| EP | 0 176 707 A1 | 4/1986 |
| EP | 0 259 130 A2 | 3/1988 |
| EP | 0 263 412 | 4/1988 |
| EP | 0 282 855 A2 | 9/1988 |
| EP | 0 608 892 | 8/1994 |
| EP | 0 655 516 A1 | 5/1995 |
| EP | 0 792 920 | 9/1997 |
| EP | 0 803 780 A1 | 10/1997 |
| EP | 0 857 764 A2 | 8/1998 |
| EP | 0 969 052 A1 | 1/2000 |
| EP | 0 982 378 | 3/2000 |
| EP | 1 061 106 A1 | 12/2000 |
| EP | 1 061 107 A1 | 12/2000 |
| EP | 1 103 173 A1 | 5/2001 |
| EP | 1 134 261 A2 | 9/2001 |
| EP | 1 167 470 A | 1/2002 |
| EP | 1 347 018 A1 | 9/2003 |
| FR | 1 233 251 | 10/1960 |
| GB | 895990 | 5/1962 |
| JP | 3-124772 | 5/1991 |
| JP | 5-78110 | 3/1993 |
| JP | 6-228371 | 8/1994 |
| JP | 6-279624 | 10/1994 |
| JP | 7-258578 | 10/1995 |
| JP | 08-015895 | 1/1996 |
| JP | 9-67528 | 3/1997 |
| JP | 9-124312 | 5/1997 |
| JP | 9-235485 | 9/1997 |
| JP | 10-140033 | 5/1998 |
| JP | 11-012487 | 1/1999 |
| JP | 11-092686 A | 4/1999 |
| JP | 11-158425 | 6/1999 |
| JP | 11-189735 | 7/1999 |
| JP | 11-189736 | 7/1999 |
| JP | 11-315220 | 11/1999 |
| JP | 11-349309 | 12/1999 |
| JP | 2000-212468 | 8/2000 |
| JP | 2000-248118 | 9/2000 |
| JP | 2000-248194 | 9/2000 |
| JP | 2000-248196 | 9/2000 |
| JP | 2000-248197 | 9/2000 |
| JP | 2000-290529 | 10/2000 |
| JP | 2001-40240 | 2/2001 |
| JP | 2001-214068 | 8/2001 |
| JP | 2001-240768 | 9/2001 |

| | | |
|---|---|---|
| JP | 2001-254033 | 9/2001 |
| JP | 2001-329205 | 11/2001 |
| JP | 2002-080758 | 3/2002 |
| JP | 2003-049101 | 2/2003 |
| JP | 2003-201418 A | 7/2003 |
| JP | 2004-067903 | 3/2004 |
| JP | 2004-75985 | 3/2004 |
| JP | 2006-008899 | 1/2006 |
| JP | 2006-022270 | 1/2006 |
| SU | 532612 | 2/1977 |
| SU | 887587 | 12/1981 |
| WO | WO 92/04415 | 3/1992 |
| WO | WO 92/13983 | 8/1992 |
| WO | WO 95/23038 | 8/1995 |
| WO | WO 96/18688 | 6/1996 |
| WO | WO 96/18694 A2 | 6/1996 |
| WO | WO 97/32571 A1 | 9/1997 |
| WO | WO 98/42192 | 10/1998 |
| WO | WO 98/42778 | 10/1998 |
| WO | WO 98/45361 | 10/1998 |
| WO | WO 99/58617 | 11/1999 |
| WO | WO 00/09254 | 2/2000 |
| WO | WO 00/77104 | 12/2000 |
| WO | WO 01/55050 | 8/2001 |
| WO | WO 03/014238 A | 2/2003 |
| WO | WO 03/055959 A1 | 7/2003 |
| WO | WO 03/064540 A1 | 8/2003 |
| WO | WO 2004/046256 A1 | 6/2004 |
| WO | WO 2005/017047 A1 | 2/2005 |
| WO | WO 2005/022667 A2 | 3/2005 |
| WO | WO 2005/028978 A1 | 3/2005 |
| WO | WO 2006/061110 A1 | 6/2006 |
| WO | WO 2006/066132 A2 | 6/2006 |
| WO | WO 2007/027625 A2 | 3/2007 |
| WO | WO 2008/148639 A2 | 12/2008 |
| WO | WO 2010/043562 A1 | 4/2010 |
| WO | WO 2007/039604 A2 | 4/2012 |

OTHER PUBLICATIONS

English language abstract for CN 1858531 A.
English language abstract for DE 36 15 571.
English language abstract for DE 198 24 947.
English language abstract for DE 10 2007 026 214 A1.
English language abstract for JP 3-124772.
English language abstract for JP 5-78110.
English language abstract for JP 08-015895.
English language abstract for JP 9-67528.
English language abstract for JP 9-124312.
English language abstract for JP 11-158425.
English language translation for JP 11-189735.
English language abstract for JP 11-189736.
English language Abstract for JP 11-315220.
English language abstract for JP 2000-212468.
English language abstract for JP 2000-248197.
English language abstract for JP 2000-248194.
English language abstract for JP 2000-248118.
English language abstract for JP 2000-248196.
English language abstract for JP 2000-290529.
English language abstract for JP 2001-40240.
English language abstract for JP 2001-254033.
English language abstract for JP 2001-329205.
English language abstract for JP 2004-75985.
English language abstract for JP 2006-008899.
English language abstract for SU 532612.
English language abstract for SU 887587.
English language abstract for WO 92/13983.
English language abstract for WO 01/55050.
Franklin, et al., "An Enhanced CVD Approach to Extensive Nanotube Networks with Directionality," *Advanced Materials* 12:890-894 (2000).
McMillan, et al., "High Velocity Attrition Nozzles in Fluidized Beds," *Powder Technology* 175:133-141 (2007).
Ohkita, et al., "The Competitive Reactions of Initiator Fragments and Growing Polymer Chains Against the Surface of Carbon Black," *Carbon* vol. 16:41-45 (1978).
Wang, et al., "Using Pulsed Flow to Overcome Defluidization," *Chemical Engineering Science* 60:5177-5181 (2005).
European Search Report for Application No. EP 09 17 7966.
English language abstract for DE197 31 572 A1.
English language abstract for DE 10 2004 058 271 A1.
English language translation of summary for FR 1 233 251.
English language abstract for WO 03/055959 A1.
English language abstract for WO 2010/043562 A1.
*Chemielexikon Römpp*; Römpp Online-ID=RD-07-00259, Gas Black; http://www.roempp.com/prod/roemp.php.
"Improved Test for Determination of Carbon Black Structure" presented by Wesley Wampler; Carbon Black World 2004; Nov. 15, 2004; XP002637916.
English language abstract for JP 2002-080758.
Machine translation of JP 2002-080758.
English language abstract for JP 2003-049101.
Machine translation of JP 2003-049101.
English language abstract for JP 2004-067903.
Machine translation of JP 2004-067903.
English language abstract for JP 11-092686.
Machine translation of JP 11-092686.
English language abstract for JP 2003-201418.
U.S. Appl. No. 13/538,861, filed Jun. 29, 2012, Quitmann, et al.
English language abstract for JP 6-228371.
Machine translation of JP 6-228371.
English language abstract for JP 6-279624.
English language abstract for JP 9-235485.
English language abstract for JP 10-140033.
English language abstract for JP 11-012487.
Machine translation of JP 11-012487.
English language abstract for JP 11-349309.
Machine translation of JP 11-349309.
English language abstract for JP 2001-240768.
Machine translation of JP 2001-240768.
English language abstract for JP 2006-022270.
Machine translation of JP2006-022270.
English language abstract for JP 2001-214068.
Machine translation of JP2001-214068.

* cited by examiner

Rated 1:
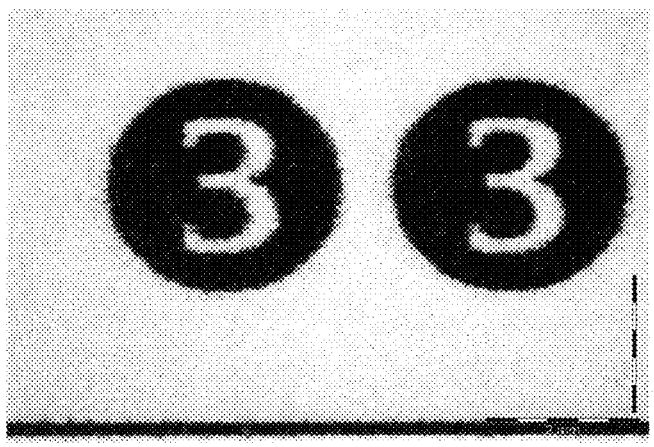
Rated 2:
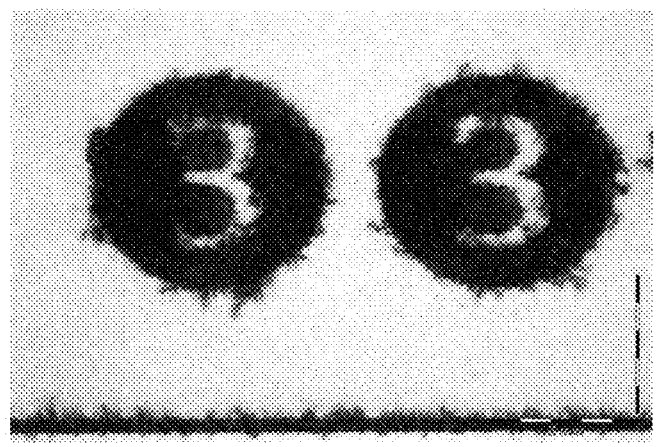
Rated 3:
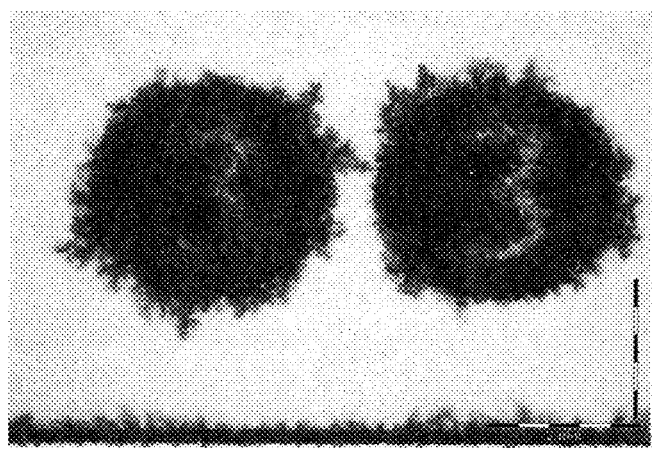

INK JET INK

CROSS REFERENCE TO RELATED APPLICATIONS

The present application claims priority to application DE 10 2008 061 737.7, filed in Germany on Dec. 12, 2008, the contents of which is hereby incorporated by reference in its entirety.

FIELD OF THE INVENTION

The invention relates to an ink jet ink, to its preparation and also to its use.

BACKGROUND OF THE INVENTION

EP 0 969 052 discloses ozone-oxidized carbon blacks having a volatile content above 10% by weight and a CTAB/iodine ratio above 2 m²/g.

EP 1 061 106 discloses ink jet inks comprising a colorant having functional groups, of which ester groups

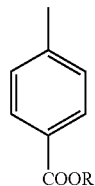

improve intercolour bleeding control and waterfastness and

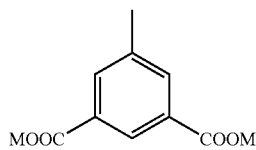

groups improve water dispersibility.

EP 1 061 107, further, discloses ink jet inks comprising a colorant having functional groups, of which —R₁—COOM and —Ar—CONHR₁COOM improve intercolour bleeding control and waterfastness and

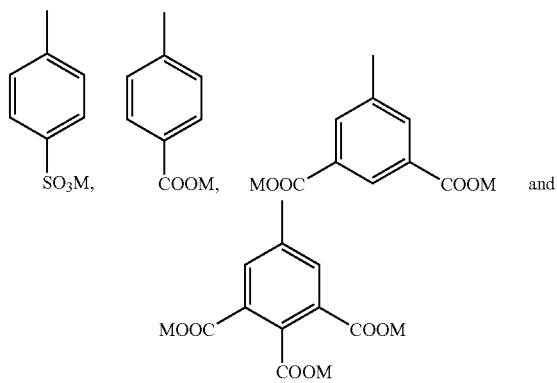

groups improve water dispersibility.

DESCRIPTION OF THE INVENTION

It is an object of the invention to provide an ink jet ink which exhibits good intercolour bleeding control on printing and also has good optical density, wherein the optical density and the intercolour bleeding control of the ink may be controlled in a specific manner via the ratio of pigment to oxidized carbon black.

The invention accordingly provides an ink jet ink characterized in that it contains at least one pigment and at least one oxidized carbon black.

Pigment and oxidized carbon black in the ink jet ink are not identical. Therefore, when the pigment is an oxidized carbon black, the pigment and the oxidized carbon black will differ in their physical/chemical data.

The oxidized carbon black may be an ozone-oxidized carbon black.

The oxidized carbon black may have a volatiles content (DIN53552) in the range from 3% to 40%, preferably in the range from 10% to 30% and more preferably in the range from 15% to 25%.

The oxidized carbon black may have a BET surface area (ISO4652) in the range from 5 to 1100 m²/g, preferably in the range from 30 to 700 m²/g and more preferably in the range from 50 to 400 m²/g.

The oxidized carbon black may have an OAN value (ISO4656) in the range from 40 to 200 ml/100 g, preferably in the range from 60 to 180 ml/100 g and more preferably in the range from 100 to 170 ml/100 g.

The oxidized carbon black may have a pH value (ISO787-9) in the range from 1 to 7, preferably in the range from 2 to 5 and more preferably in the range from 2 to 4.

The oxidized carbon black may be an oxidized gas, flame, thermal, furnace, channel or plasma black.

The oxidized carbon black is obtainable by treating a carbon black with an oxidizing agent, for example ammonium peroxodisulphate, hydrogen peroxide, ozone, oxygen (pure or as air), potassium bromate and/or sodium perborate.

The pigment used may be carbon material or colour pigment.

Colour pigment used can be for example yellow, orange, red, magenta, violet, blue, cyan, green or brown pigment. Colour pigment used can preferably be inorganic blue pigment, for example iron blue, ultramarine blue, cobalt blue or mixed phase blue pigment, or organic blue pigment, for example phthalocyanine blue or indanthrene blue.

Carbon material used can be carbon black, graphite powder, graphite fibres, carbon fibres, carbon fibrils, carbon nanotubes, aerogels, carbon aerogels, carbon fabrics, glassy carbon products, activated carbon and fullerenes.

Carbon black used can be furnace black, gas black, channel black, flame black, thermal black, acetylene black, plasma black, inversion black known from DE 195 21 565, Si-containing blacks known from WO 98/45361 or DE 196 13 796, or metal-containing blacks known from WO 98/42778, arc black and blacks which are by-products of chemical manufacturing operations.

The pigment can be activated by preceding reactions. The pigment can be a non-oxidized carbon black.

It is possible to use carbon materials which are used as reinforcing filler in rubber mixtures. Pigment grade carbon blacks can be used. Further carbon materials can be: conductivity black, carbon material for UV stabilization, carbon material as filler in systems other than rubber, for example in bitumen or plastic, or carbon material useful as reducing agent in metallurgy.

The weight ratio of pigment to oxidized carbon black may be in the range from 0.5 to 0.1 and preferably in the range from 0.3 to 0.2.

The content of pigment and oxidized carbon black may be in the range from 1% to 7% by weight and preferably in the range from 3% to 5% by weight, based on the ink jet ink.

The oxidized carbon black content may be in the range from 0.5% to 5.6% by weight and preferably in the range from 3.5% to 6.3% by weight, based on the ink jet ink.

The pigment content may be in the range from 0.05% to 2.8% by weight and preferably in the range from 0.1% to 1.5% by weight, based on the ink jet ink.

The ink jet ink according to the invention may contain wetting agent or be wetting agent free.

Useful wetting agents include anionic, cationic and/or nonionic wetting agents.

Anionic wetting agent used can be naphthalenesulphonic acid condensate, for example Tamol, or lignosulphonate, for example Vanisperse CB. Cationic wetting agent used can be cationic fatty ester, for example Akypoquat 132 from Kao Chemicals GmbH, quaternary fluoroalkylammonium iodide, for example Bayowet FT 738 VP AC 2023 from Bayer AG, cationic homopolymers, for example DP2-7949 from Ciba Geigy Chemicals, cationic polymers, for example DP7-7961, DP7-7962 or DP7-7963 from Ciba Geigy Chemicals, phosphatidylcholine, for example Epikuron 200 from Lukas Meyer, ethoxylated fatty amine, for example Ethoxamine SF 11 and Ethoxamine SF 15 from Witco, carboxylic acid-diamine preparation, for example Forbest 610 from Lukas Meyer, cationic condensation resins, for example Magnafloc 1797 from Ciba Speciality Chemicals, dimethyl-C12/14-alkylbenzylammonium chloride, for example Protectol KLC 50 from BASF, cocopentaethoxymethylammonium methosulphate, for example Rewoquat CPEM from Witco Surfactants GmbH, ricinoleic acid propylamido trimethylammonium methosulphate, for example Rewoquat® 50 from Witco Surfactants GmbH, alkylimidazoline for example Sochamine 35 from Witco Surfactants GmbH.

Nonionic wetting agent used can be a compound from the group consisting of crosslinked polyoxyethyleneacrylic acid, fatty alcohol oxethylates, nonylphenol polyglycol ethers, polyvinylpyrrolidone, glycerol fatty acid esters, propylene glycol fatty acid esters, sorbitan fatty acid esters, polyoxyethylene sorbitan fatty acid esters, tetraoleic acid polyoxyethylene sorbitol, polyoxyethylene alkyl ethers, polyoxyethylene alkyl phenyl ethers, polyoxyethylene polyoxypropylene glycol, polyoxyethylene polyoxypropylene alkyl ethers, polyethylene glycol fatty acid esters, higher fatty acid alcohol esters, polyhydric alcohol fatty acid esters.

The ink jet ink according to the invention may contain at least one solvent. The solvent may be water, alcohols, for example 1,2-hexanediol, glycol ethers, for example dipropylene glycol, heterocycles, for example 2-pyrrolidone, or glycerol.

The ink jet ink according to the invention may additionally contain one or more additives, such as biocides, ketones, glycols, alcohols or mixtures of the abovementioned compounds. These additives can be added for specific uses and for example also consist of monomeric, oligomeric or polymeric compounds. These additives can effect improvements of properties, such as degree of dispersion, storage stability, freeze stability, drying behaviour, filming behaviour, wettability and/or attachment to certain carrier materials, such as paper, metal, glass, polymers, fibres, leather, wood, concrete or rubber.

The biocide can be added in amounts of 0.01-1.0% by weight. Useful biocides include isothiazolinone derivatives, formaldehyde donors or combination products of the two classes of product. The biocide used can be for example Parmetol from Schülke & Mayr, Ebotec from Bode Chemie, Acticide from Thor Chemie or Proxel from Zeneca.

The ink jet ink according to the invention may comprise a dye.

The dyes used can be azo compounds. The azo compounds can be 2-[4-(1-hydroxy-6-phenylamino-3-sulpho-naphthalen-2-ylazo)-6-sulphonaphthalen-1-ylazo]-5-methylbenzene-1,4-disulphonic acid, 5-[4-(4-(7-[2-ethoxy-4-(4-methyl-2-sulphophenylazo)-6-sulpho-naphthalen-1-ylazo]-8-hydroxy-3,6-disulphonaphthalen-1-ylamino)-6-phenylsulphanyl-[1,3,5]-triazin-2-yl-amino]phenylazo]-2-hydroxybenzoic acid and tetrasodium-6-amino-4-hydroxy-3-[[7-sulphonato-4-[(4-sulphonatophenyl)azo]-1-naphthyl] azo]naphthalene-2,7-disulphonate, Mordant Blue 13, Mordant Green 17, Direct Black 195, Acid Black 1 or Acid Black 2.

The ink jet ink of the invention may comprise a dispersion-augmenting additive. The dispersion-augmenting additive can be used in amounts of 0.1-30% by weight, preferably 0.3-10% by weight, based on the ink. The molecular weight of the dispersion-augmenting additive can be 1000 to 20 000 g/mol, preferably 14 500 to 17 000 g/mol. The acid value of the dispersion-augmenting additive can be 120 to 320, preferably 180 to 280. Styrene-acrylic acid copolymers can be used as dispersion-augmenting additive. The copolymers can be random, alternating, block or graft copolymers. Joncryl 678, Joncryl 680, Joncryl 682 or Joncryl 690 from Johnson Polymer B.V. can be used as dispersion-augmenting additive for example. Fully ammonium-or alkali metal hydroxide-neutralized forms, especially NaOH-neutralized forms, of the styrene-acrylic acid copolymers can be used as dispersion-augmenting additive.

The invention further provides a process for preparing the ink jet ink, characterized in that the pigment is dispersed in at least one solvent, followed by addition of the oxidized carbon black and further dispersing.

A wetting agent can be added for dispersing the pigment. A wetting agent can be added for dispersing the oxidized carbon black.

Dispersing can be effected using bead mills, ultrasonicators, wing stirrers, dissolvers or an Ultra-Turrax. After dispersing, the ink can be centrifuged or filtered.

An acidic pH can be set for the ink by using inorganic acids, preferably hydrochloric acid. The pH of the ink can be in the range from 7 to 12, and preferably in the range from 8 to 10.

The ink according to the invention can be used for printing paper, metal, foil, film, sheet, textiles or glass.

The invention further provides a process for improving intercolour bleeding control of ink jet inks, characterized in that the ink contains at least one pigment and at least one oxidized carbon black.

The ink jet ink according to the invention has the advantage that intercolour bleeding control is improved compared with the prior art while at the same time optical density is good.

BRIEF DESCRIPTION OF THE DRAWINGS

FIG. 1: Intercolour bleeding is evaluated visually under a stereomicroscope according to the assessment scale depicted in FIG. 1.

EXAMPLES

1. Preparation of the Suspension

All constituents other than the pigment and the oxidized carbon black are initially charged to a container and homogenized by stirring. The pigment is incorporated into the solution a little at a time by slow stirring (either by hand or using a slow stirrer).

2. Dispersing

The suspension prepared in point 1 is dispersed with an ultrasonicator. This is followed by incorporation of the oxidized carbon black a little at a time and renewed dispersing. Very coarse particles can be separated from the resulting suspension in a centrifuge.

Table 1 shows the compositions and properties of the suspensions obtained.

TABLE 1

|  |  | Suspension 1 | Suspension 2 | Suspension 3 | Suspension 4 |
|---|---|---|---|---|---|
| Printex U | % | 15.0 | 15.0 | — | 2.8 |
| Printex U ozone-oxidized | % | — | — | 15.0 | 12.2 |
| Direct Black 195 | % | — | 1.0 | — | 0.2 |
| Acticide MBS | % | 0.3 | 0.3 | 0.3 | 0.3 |
| DMEA |  | adjusted to pH 9.0 | | | |
| Completely ion-free water | % | 84.7 | 84.7 | 84.8 | 84.5 |
| Consistency |  | firm | liquid | liquid | liquid |
| Photomicroscopic degree of dispersion |  | not applicable | good | good | good |

The pigment used is Printex U gas black. Printex U is a non-oxidized gas black from Evonik Degussa GmbH with a primary particle size of 25 nm. Direct Black 195 is an azo dye from FujiFilm Imaging Colorants. DMEA is dimethylaminoethanol from Merck. The oxidized carbon black used is ozone-oxidized Printex U, ozone-oxidized as described in EP 0 969 052. Suspension 1 has too firm a consistency for further processing into ink.

3. Preparation of the Ink Jet Ink and Metered Incorporation of the Oxidized Carbon Black A premix is prepared from all ink additives and solvents by stirring. The premix obtained is carefully added with slow stirring to the suspension obtained under point 2. Very coarse particles can be separated from the resulting suspension in a centrifuge.

Table 2 shows the compositions and properties of the reference inks and of the inventive ink based on pigment and oxidized carbon black.

Photomicroscopic examination of the degree of dispersion was done at 500-fold magnification. Coarse particles >1 μm are readily discernible.

Assessment scale:
Very good: no coarse fractions >1 μm
Good: very few coarse fractions >1 μm
Poor: many coarse fractions >1 μm

TABLE 2

|  |  | Reference ink 1 | Reference ink 2 | Inventive ink 1 |
|---|---|---|---|---|
| Suspension 2 | % | 30.0 | — | — |
| Suspension 3 | % | — | 30.0 | — |
| Suspension 4 | % | — | — | 30.0 |
| 1,2-Propanediol | % | 6.0 | 6.0 | 6.0 |
| 1-Methoxy-2-propanol | % | 5.0 | 5.0 | 5.0 |
| Dipropylene glycol | % | 3.0 | 3.0 | 3.0 |
| PEG 10000 | % | 0.6 | 0.6 | 0.6 |
| IDIS@solv.hd | % | 1.6 | 1.6 | 1.6 |
| DMEA |  | adjusted to pH 8.5 | | |
| Completely ion-free water | % | 53.8 | 53.8 | 53.8 |
| Printing tests with Canon-S750 office printer | | | | |
| Optical density on Inapa Tecno Office copier paper |  | 1.49 | 1.25 | 1.47 |
| Optical density on Canon HR-101 inkjet paper |  | 1.53 | 1.35 | 1.50 |
| Intercolour bleeding on Inapa Copy copier paper |  | 3 | 1 | 1 |
| Intercolour bleeding on Compass Copy copier paper |  | 3 | 1 | 1 |

1,2-Propanediol is available from Sigma Aldrich. 1-Methoxy-2-propanol, dipropylene glycol, PEG 10000 are products from Merck Schuchhardt and IDIS@ solv.hd is a product from Evonik Degussa GmbH.

A Canon-BJC-S750 inkjet office printer is used to prepare printing demonstrations on copier paper and inkjet paper. Beforehand, the ink is devolatilized in vacuo and introduced into a cleaned original printer cartridge. The printing demonstrations are dried at room temperature for 24 h. Optical density is determined using a densitometer.

Intercolour bleeding is evaluated visually under a stereomicroscope according to the assessment scale depicted in FIG. 1.

The inventive ink 1, when compared with reference inks 1 and 2, gives excellent results in optical density on copier paper and inkjet paper as well as low intercolour bleeding.

What is claimed is:

1. An ink jet ink, comprising at least one pigment and at least one oxidized carbon black, wherein said oxidized carbon black:
   a) is obtained by a process consisting of treating a carbon black with one or more oxidizing agents; and
   b) has a pH in the range of from 1 to 5 as measured according to ISO787-9;
   c) has a volatiles content in the range of from 10% to 30%.

2. The ink jet ink of claim 1, wherein said oxidized carbon black has a volatiles content in the range of from 15% to 25%.

3. The ink jet ink of claim 1, wherein said one or more oxidizing agents are selected from the group consisting of: ammonium peroxodisulphate, hydrogen peroxide, ozone, oxygen (pure or as air), potassium bromate and sodium perborate.

4. The ink jet ink of claim 2, wherein the weight ratio of pigment to oxidized carbon black is in the range of from 0.5 to 0.1.

5. The ink jet ink of claim 1, wherein the oxidized carbon black content in said ink jet ink is in the range of from 0.5% to 5.6% by weight.

6. The ink jet ink of claim 5, wherein said oxidized carbon black has a volatiles content in the range of from 15% to 25%.

7. The ink jet ink of claim 6, wherein the weight ratio of pigment to oxidized carbon black is in the range of from 0.5 to 0.1.

8. The ink jet ink of claim 5, wherein the weight ratio of pigment to oxidized carbon black is in the range of from 0.5 to 0.1.

9. The ink jet ink of claim 1, wherein the pigment content is in the range from 0.05% to 2.8% by weight.

10. The ink jet ink of claim 9, wherein said oxidized carbon black has a volatiles content in the range of from 15% to 25% and the weight ratio of pigment to oxidized carbon black is in the range of from 0.5 to 0.1.

11. The ink jet ink of claim 9, wherein the oxidized carbon black content in said ink jet ink is in the range of from of 0.5% to 5.6% by weight; and said oxidized carbon black has a volatiles content in the range of from 15% to 25%.

12. The ink jet ink of claim 11, wherein the weight ratio of pigment to oxidized carbon black is in the range of from 0.5 to 0.1.

13. A process for preparing the ink jet ink of claim 1, comprising:
 a) dispersing a pigment in at least one solvent;
 b) adding an oxidized carbon black, wherein said oxidized carbon black:
  i) is obtained by a process consisting of treating a carbon black with one or more oxidizing agents; and
  ii) has a pH in the range of from 1 to 5 as measured according to ISO787-9; and
 c) dispersing said pigment and said oxidized carbon black in said solvent.

14. In an ink jet printing process, the improvement comprising reducing intercolour bleeding by using an ink comprising at least one pigment and at least one oxidized carbon black, wherein said oxidized carbon black:
 a) is obtained by a process consisting of treating a carbon black with one or more oxidizing agents; and
 b) has a pH in the range of from 1 to 5 as measured according to ISO787-9;
 c) has a volatiles content in the range of from 10% to 30%.

15. The improvement of claim 14, wherein said oxidized carbon black in said ink has a volatiles content in the range of from 15% to 25%.

16. The improvement of claim 14, wherein the weight ratio of pigment to oxidized carbon black in said ink is in the range of from 0.5 to 0.1.

17. The improvement of claim 15, wherein the weight ratio of pigment to oxidized carbon black in said ink is in the range of from 0.5 to 0.1.

18. The improvement in claim 14, wherein the oxidized carbon black content in said ink jet ink is in the range of from of 0.5% to 5.6% by weight.

19. The improvement of claim 14, wherein said ink jet ink printing process is used for printing textiles, metal, foil, film, sheet, glass or paper.

20. The improvement of claim 14, wherein:
 a) said oxidized carbon black in said ink has a volatiles content in the range of from 15% to 25%;
 b) the weight ratio of pigment to oxidized carbon black in said ink is in the range of from 0.5 to 0.1; and
 c) the oxidized carbon black content in said ink jet ink is in the range of from of 0. 5% to 5.6% by weight.

* * * * *